ively, none, as far as I am aware, was entirely successful when carried into practice commercially on an industrial scale.

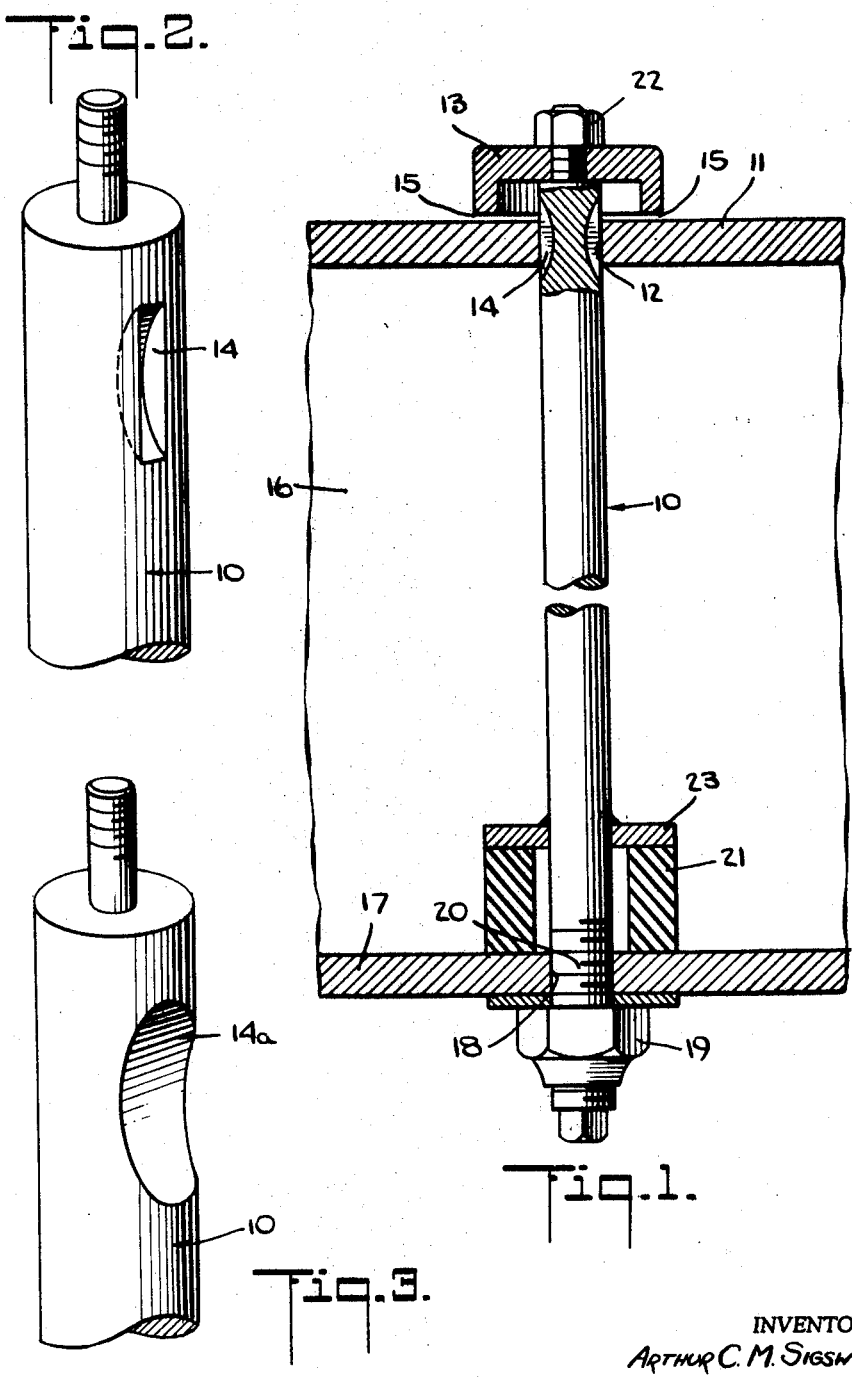

United States Patent Office 3,183,064
Patented May 11, 1965

3,183,064
APPARATUS FOR CONTACTING OF SOLIDS WITH GASES IN A FLUIDIZED BED
Arthur Charles Morris Sigsworth, Lyde, near Hereford, England, assignor to The International Nickel Company, Inc., New York, N.Y., a corporation of Delaware
Filed Aug. 1, 1962, Ser. No. 214,117
Claims priority, application Great Britain, Aug. 29, 1961, 31,076/61
5 Claims. (Cl. 23—284)

The present invention relates to a novel means for contacting solids with gases by the well known fluidized solids technique and, more particularly, to a novel fluidized bed gas inlet nozzle which is easily adjustable by means located outside of the fluid bed reactor.

It is well known that in the fluidization of solid particles, it is customary to introduce the fluidizing medium, which may be air or other gas, through nozzles which are usually uniformly disposed over the base of the vessel in which the fluidization takes place, that is to say, over the support for the bed. Beneath this vessel there is a gas chamber which may be subdivided into compartments and into which gas is introduced under pressure throughout the whole fluidizing process.

In practice, difficulty is experienced in obtaining even and consistent fluidization. It is very difficult to make all the nozzles identical in dimensions and surface finish and, in any case, the gas chamber cannot be made frictionless throughout its length so that the pressures at the nozzles are not all the same. As a result, there is uneven pressure drop through every nozzle. Moreover, the material to be fluidized may vary and the different pressures required to produce the same flow of air or other gas through different materials result in unpredictable changes in the stability of the fluidized material. It is found that there is a tendency for pressure to build up locally and cause eruption of the fluidized bed.

Although attempts were made to overcome the foregoing difficulties and other difficulties, none, as far as I am aware, was entirely successful when carried into practice commercially on an industrial scale.

It has now been discovered that by means of a novel adjustable gas inlet nozzle described hereinafter substantially equal pressure drop across each nozzle in a fluidized bed may be attained with adjustments of any nozzle being possible while the fluidized bed is operating.

It is an object of the present invention to provide a novel technique for effecting uniform fluidization in a fluid bed reactor.

Another objects of the invention is to provide novel gas inlet nozzles for a fluidized bed which may be adjusted externally during operation of the bed.

The invention also contemplates providing an adjustable gas inlet nozzle for a fluidized bed designed to reduce uneven pressure drop in nozzles throughout the bed.

It is a further object of the invention to provide improved stability in fluid bed reactors by means of a novel adjustable gas inlet nozzle.

The invention further contemplates providing novel means for preventing local pressure build-ups and eruptions in a fluidized bed with an externally adjustable gas inlet nozzle.

It is another object of the invention to provide a reaction chamber for the fluidizing of finely divided solids fitted with externally adjustable gas inlet nozzles by which very uniform reactor operation may be attained.

Other objects and advantages will become apparent from the following description taken in conjunction with the accompanying drawing in which:

FIGURE 1 is a vertical longitudinal section of an embodiment of the hereindescribed novel adjustable gas inlet nozzle, FIG. 2 depicts a perspective view of an embodiment of the portion of the nozzle stem containing a recessed portion, and FIG. 3 shows a perspective view of another embodiment of the recessed portion on the nozzle stem.

Generally speaking, according to the present invention, each gas inlet nozzle comprises a head carried by a stem that passes through an opening in the support for the fluidized bed, the gas flowing through the opening and radially beneath the head to fluidize the mass. Each stem extends completely through the gas chamber and through a gland in the bottom wall of the gas chamber and means are provided for adjusting the position of the stem so as to vary the nozzle opening. Thus, each nozzle can be adjusted so that there is equal pressure drop across each nozzle in the bed and this adjustment can be effected while the bed is working. In the preferred construction, the gland in the bottom wall of the gas chamber is a rubber sleeve compressed between a flange on the stem and the bottom of the gas chamber. Adjustment may be effected most easily by threading the stem to engage a threaded opening in the bottom wall of the gas chamber so that it is only necessary to turn the stem and then hold it in position by an external nut.

It is important that at all settings of the nozzle the area available for flow of air or other gas between the head of the nozzle and the support should be less than that available for flow around the stem through the opening in the support, since otherwise it is impossible to control the resistance to flow by axial movement of the nozzle.

It is also desirable that each nozzle may, if necessary, be completely shut down to prevent any granular material entering and blocking the passage that should be available for the flow of gas. The head of the nozzle is preferably of inverted dish shape, the rim of the dish being ground to mate exactly with a ground surface on the support for the fluidized bed, and the degree of adjustment is made such that the ground surfaces of the nozzle heads can be brought into contact with the mating surfaces of the bed support.

Since the gap between the ground surfaces should be uniform in width all around the nozzle, it is also desirable to support the stem at the point where it passes through a hole in the support for the bed. This can easily be done by making the stem fit the hole closely without blocking it. For instance, the hole in the support and the stem may be circular in cross section and part of the material of the stem may be cut away by milling over diametrically opposite areas that extend through the hole.

Referring now to the drawing, FIGURE 1 shows a cross section of my novel adjustable valve installed in the reaction chamber of a fluidized bed reactor. Stem 10 of the valve passes upwards through opening 12 in the support 11 for the fluidized bed. The upper portion of the stem has a head 13 attached thereto by means of threads or by being welded on or it may be fixed to the stem by nut 22 as shown in FIGURE 1. The head is preferably of inverted, circular, dish shape either of rectangular cross section as shown in FIGURE 1 or it may have a curved cross section or a conical cross section. As described hereinbefore, the rim of the dish is made to mate with the upper surface of the support 11 to allow complete shutting down of the nozzle.

Gases flow from chamber 16 of the reactor around the stem and through hole 12 of the support into the space under head 13 and finally through opening 15 between the head rim and support 11 into the fluidized bed chamber. As previously set forth, the total area through which gases flow around the stem must always be greater than the total area by which gases flow through opening 15 in order to properly control flow by axial movement of the nozzle to increase or decrease opening 15. In order to allow proper even seating of the whole rim of head 13 on support 11 when the valve is in the closed position, the stem should preferably be firmly supported through opening 12 in the support 11. This is best accomplished by making the stem fit the hole closely and by removing portions of the stem, as shown in FIGURE 1, through which fluidizing gases may pass. Thus, slots 14 shown in FIGURE 2 may be milled out of the stem 10 or portions may be ground or milled across the face of the stem 10 as shown by recessed portion 14a in FIGURE 3.

As shown in FIGURE 1, stem 10 extends completely through gas chamber 16 and through hole 18 in the bottom wall 17 of the chamber. Adjusting means such as by threading the stem 10 to engage hole 18 which may also be threaded are provided on the lower end 20 of the stem to allow the stem to be raised and lowered, thereby varying the nozzle opening 15. The stem is then held in position by retaining means such as nut 19. Other retaining means may be utilized on the lower end 20 of stem 10, such as by using a machine screw feeding into an interior threaded portion on the nozzle stem. Gas sealing means are provided between the stem 10 and bottom wall 17. Advantageously, this is provided by means of a compressible rubber sleeve 21, as shown in FIGURE 1, which is compressed between flange 23 on the stem and bottom wall 17. Alternatively suitable packing may be used between nut 19 and bottom wall 17.

It is to be observed that the present invention provides a novel arrangement for introducing gases to a fluidized bed through nozzles attached to the fluid bed support whereby each nozzle can be easily adjusted so that there is substantially equal pressure drop across each nozzle in the bed. Furthermore, this adjustment can be readily effected while the fluidized bed is in operation.

It is also to be observed that although adjustment of each nozzle has been specifically shown by screw means, other adjusting mechanisms can be utilized such as by raising and lowering the valve stems hydraulically. Remote control of adjustment of each valve stem can be attained by electrical operation of valve lifters.

Although the present invention has been described in conjunction with preferred embodiments, it is to be understood that modifications and variations may be resorted to without departing from the spirit and scope of the invention, as those skilled in the art will readily understand. Such modifications and variations are considered to be within the purview and scope of the invention and appended claims.

I claim:

1. An improved fluidized bed gas inlet nozzle comprising a fluidized bed support; an aperture in said fluidized bed support; a stem of circular cross section having an upper and lower end, the upper end fitting slidably and being firmly supported in said aperture and extending upwardly through said aperture and into the chamber above said support and the lower end fitting into the bottom wall of a gas chamber below said support; an inverted, removable, dish-type head attached to the upper end of said stem and located inside the chamber above said support, the lower surface of said head being ground to be matable with the ground, upper surface of the fluidized bed support; at least one recessed portion in said stem with a length along the stem greater than the thickness of said support and located in the portion of the stem fitting slidably in and extending through the aperture in said support, said recessed portion being so constructed to provide an area for gas flow around the stem and through the aperture in said support at any adjusted setting of the nozzle greater than the area for gas flow between the head of said nozzle and the fluidized bed support; gas sealing means on the lower end of the stem between the stem and said bottom wall; and adjusting means attached to the lower end of the stem bearing on the bottom wall and allowing adjustment of the position of the stem so as to vary the area for gas flow between the lower surface of said head and said fluidized bed support.

2. A gas inlet nozzle as described in claim 1 in which the gas sealing means on the lower end of the stem consists of a rubber sleeve gland compressed between the bottom wall of the gas chamber below the support and a circular flange located on said stem.

3. A gas inlet nozzle as described in claim 1 in which the adjusting means on the lower end of the stem consists of a threaded portion on said lower end engaging a threaded opening in the bottom wall of the gas chamber.

4. An improved fluidized bed gas inlet nozzle comprising a fluidized bed support; an aperture in said fluidized bed support; a stem having an upper and lower end, the upper end fitting slidably and being firmly supported in said aperture and extending upwardly through said aperture and into the chamber above said support and the lower end fitting into the bottom wall of a gas chamber below said support; an inverted dish-type head attached to the upper end of said stem and located inside the chamber above said support, the lower surface of said head being matable with the upper surface of said fluidized bed support; at least one recessed portion in said stem with a length along the stem greater than the thickness of said support and located in the portion of the stem fitting slidably in and extending through the aperture in said support, said recessed portion being so constructed to provide an area for gas flow around the stem and through the aperture in said support at any adjusted setting of the nozzle greater than the area for gas flow between the head of said nozzle and the fluidized bed support; gas sealing means on the lower end of said stem between the stem and said bottom wall; and adjusting means attached to the lower end of said stem bearing on said bottom wall and allowing adjustment of the position of the stem so as to vary the distance between the lower surface of said head and said fluidized bed support.

5. A fluidized bed chamber for the fluidizing of finely divided solids having externally adjustable gas inlet nozzles and a fluidized bed support, each of said nozzles comprising an aperture in the fluidized bed support; a stem having an upper and lower end, the upper end fitting slidably and being firmly supported in the aperture and extending upwardly through the aperture and into the chamber above said support and the lower end fitting into the bottom wall of a gas chamber below said support; an inverted dish-type head attached to the upper end of said stem and located inside the chamber above said support; the lower surface of said head being matable with the upper surface of the fluidized bed support; at least one recessed portion in said stem with a length along the stem greater than the thickness of said support and located in the portion of the stem fitting slidably in and extending through the aperture in said support, said recessed portion being so constructed to provide an area for gas flow around the stem and through the aperture in said support at any adjusted setting of the nozzle greater than the area for gas flow between the head of said nozzle and the fluidized bed support; gas sealing means on the lower end of said stem between the stem and said bottom wall; and adjusting means attached to the lower end of the stem bearing on said bottom wall and allowing adjustment of the position of the stem so as to vary the area for gas flow between the lower surface of said head and the fluidized bed support.

References Cited by the Examiner

UNITED STATES PATENTS

| | | | |
|---|---|---|---|
| 2,404,944 | 7/46 | Brassert | 23—284 |
| 2,609,185 | 9/52 | Eisner | 259—4 |
| 2,653,058 | 9/53 | Bowen | 302—53 XR |
| 2,710,121 | 7/55 | Rees | 222—510 |

FOREIGN PATENTS 528,883   11/40   Great Britain.

MORRIS O. WOLK, *Primary Examiner.*